(12) United States Patent
Yoshihama et al.

(10) Patent No.: US 12,258,011 B2
(45) Date of Patent: Mar. 25, 2025

(54) VEHICLE CONTROLLER AND METHOD FOR CONTROLLING VEHICLE

(71) Applicant: TOYOTA JIDOSHA KABUSHIKI KAISHA, Toyota (JP)

(72) Inventors: Yuki Yoshihama, Tokyo-to (JP); Taiyo Uejima, Tokyo-to (JP); Toshiki Furutani, Tokyo-to (JP); Yoshinao Takemae, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 410 days.

(21) Appl. No.: 17/695,080

(22) Filed: Mar. 15, 2022

(65) Prior Publication Data

US 2022/0289185 A1 Sep. 15, 2022

(30) Foreign Application Priority Data

Mar. 15, 2021 (JP) ................................ 2021-041567

(51) Int. Cl.
*B60W 30/12* (2020.01)
*B60W 30/09* (2012.01)

(52) U.S. Cl.
CPC ............ *B60W 30/12* (2013.01); *B60W 30/09* (2013.01); *B60W 2420/403* (2013.01); *B60W 2552/53* (2020.02); *B60W 2556/40* (2020.02)

(58) Field of Classification Search
CPC ................ B60W 30/12; B60W 30/09; B60W 2420/403; B60W 2552/53; B60W 2556/40; B60W 30/095; B60W 30/0956; B60W 40/02; B60W 60/0015
See application file for complete search history.

(56) References Cited

U.S. PATENT DOCUMENTS

| | | | | |
|---|---|---|---|---|
| 2010/0030426 | A1* | 2/2010 | Okita | B60W 40/072 701/41 |
| 2018/0178783 | A1 | 6/2018 | Saiki | |
| 2020/0307380 | A1* | 10/2020 | Ikeda | B60K 35/22 |
| 2020/0353918 | A1* | 11/2020 | Goto | B60W 30/095 |
| 2023/0264689 | A1* | 8/2023 | Hiramatsu | B60W 30/143 701/301 |

FOREIGN PATENT DOCUMENTS

| | | |
|---|---|---|
| JP | 2007-249407 A | 9/2007 |
| JP | 2008-238968 A | 10/2008 |
| JP | 2018-106230 A | 7/2018 |
| JP | 2019-091325 A | 6/2019 |
| WO | 2019/044644 A1 | 3/2019 |

\* cited by examiner

*Primary Examiner* — Russell Frejd
*Assistant Examiner* — Ana D Thomas
(74) *Attorney, Agent, or Firm* — Oliff PLC

(57) ABSTRACT

A vehicle controller includes a processor configured to: detect a lane being traveled by the vehicle, set a planned trajectory to be traveled by the vehicle along the detected lane, detect a lane line demarcating the lane being traveled by the vehicle and an obstacle in an area around the vehicle, identify an effective section of the planned trajectory, the effective section being a section in which the planned trajectory and the detected lane line match, and control motion of the vehicle to avoid a collision between the obstacle and the vehicle in the case that the obstacle is located in the effective section and on the planned trajectory.

3 Claims, 5 Drawing Sheets

VEHICLE CONTROLLER AND METHOD FOR CONTROLLING VEHICLE

FIELD

The present invention relates to a vehicle controller and a method for controlling a vehicle.

BACKGROUND

A technique for automatically driving a vehicle or assisting a vehicle driver in driving has been researched. In such techniques, a planned trajectory to be traveled by a vehicle is set, and travel of the vehicle is controlled so that it will travel along the trajectory. However, an obstacle with which the vehicle may collide exists in some cases. Thus, a technique for controlling a vehicle so as not to collide with such an obstacle has been proposed (see Japanese Unexamined Patent Publication No. 2019-91325).

In a technique described in Japanese Unexamined Patent Publication No. 2019-91325, a driving assistance device assists in driving a vehicle by processing to assist in obstacle avoidance based on information on an obstacle on a planned trajectory of the vehicle as well as lane network information including at least one of feasibility information indicating whether the vehicle can change lanes from its travel lane to an adjacent lane and width information on the travel lane of the vehicle.

SUMMARY

In the case that a vehicle is controlled on the basis of the result of determination whether there is an obstacle on a planned trajectory of the vehicle, the planned trajectory needs to be appropriately set to appropriately control the vehicle. If the planned trajectory is not appropriately set, the vehicle is controlled to make a motion for avoiding an obstacle although the vehicle is unlikely to collide with an obstacle, which may make an occupant of the vehicle uneasy or uncomfortable.

It is an object of the present invention to provide a vehicle controller that can reduce the occurrence of an unnecessary motion for collision avoidance.

According to an embodiment, a vehicle controller is provided. The vehicle controller includes a memory configured to store map information and a processor. The processor is configured to compare an image generated by a camera mounted on a vehicle or a position measured by a position measuring device with the map information to detect a lane being traveled by the vehicle, the image representing surroundings of the vehicle. The position measuring device is configured to measure the position of the vehicle. The processor of the vehicle controller is further configured to set a planned trajectory to be traveled by the vehicle along the detected lane, detect a lane line demarcating the lane and an obstacle in an area around the vehicle from the image, identify an effective section of the planned trajectory, the effective section being a section in which the planned trajectory and the detected lane line match, and control motion of the vehicle to avoid a collision between the obstacle and the vehicle in the case that the obstacle is located in the effective section and on the planned trajectory.

The processor of the vehicle controller preferably identifies, as the effective section, a first section from the current position of the vehicle to a bending position where the difference between the curvatures of the planned trajectory to be traveled by the vehicle and the detected lane line exceeds a predetermined value.

Alternatively, the processor of the vehicle controller preferably identifies, as the effective section, a second section from the current position of the vehicle to a crossing position where the planned trajectory to be traveled by the vehicle and the detected lane line cross.

Alternatively, the processor of the vehicle controller preferably identifies the shorter of a first section and a second section as the effective section. The first section extends from the current position of the vehicle to a bending position where the difference between the curvatures of the planned trajectory to be traveled by the vehicle and the detected lane line exceeds a predetermined value. The second section extends from the current position of the vehicle to a crossing position where the planned trajectory and the detected lane line cross.

In this case, the processor preferably identifies, as the effective section, a third section from the current position of the vehicle to the farthest position of the detected lane line, when neither the bending position nor the crossing position is detected.

Additionally, the processor preferably controls motion of the vehicle to avoid a collision between the obstacle and the vehicle in the case that the obstacle is located outside the effective section and on the planned trajectory to be traveled by the vehicle and that the distance from the current position of the vehicle to the obstacle is not greater than a predetermined distance threshold.

According to another embodiment, a method for controlling a vehicle is provided. The method includes comparing an image generated by a camera mounted on a vehicle or a position measured by a position measuring device with map information to detect a lane being traveled by the vehicle, the image representing surroundings of the vehicle. The position measuring device is configured to measure the position of the vehicle. The method further includes setting a planned trajectory to be traveled by the vehicle along the detected lane; detecting a lane line demarcating the lane and an obstacle in an area around the vehicle from the image; identifying an effective section of the planned trajectory, the effective section being a section in which the planned trajectory and the detected lane line match; and controlling motion of the vehicle to avoid a collision between the obstacle and the vehicle in the case that the obstacle is located in the effective section and on the planned trajectory.

The travel vehicle controller according to the present invention has an advantageous effect of being able to reduce the occurrence of an unnecessary motion for collision avoidance.

DESCRIPTION OF EMBODIMENTS

A vehicle controller and a method for controlling a vehicle executed by the vehicle controller will now be described with reference to the attached drawings. The vehicle controller detects a lane being traveled by a vehicle (hereafter, a "travel lane"), and sets a planned trajectory to be traveled by the vehicle along the detected travel lane in a section from the current position to a predetermined distance away. Additionally, the vehicle controller detects a lane line dividing the travel lane and a lane adjacent thereto (hereafter, an "adjacent lane") from an image that is generated by a camera mounted on the vehicle and that represents a region around the vehicle. Based on the detected lane line, the vehicle controller further identifies a section of the planned trajectory matching the detected lane line as an effective section, which is a section of the planned trajectory effective for determination of a collision with an obstacle. In the case that an obstacle detected by the sensor mounted on the vehicle is located on the planned trajectory and in the effective section, the vehicle controller controls motion of the vehicle to avoid a collision between the obstacle and the vehicle. In this way, the vehicle controller prevents unnecessary control of motion of the vehicle even if it has erroneously recognized an adjacent lane as the travel lane and set a planned trajectory along the adjacent lane.

Figure 1:
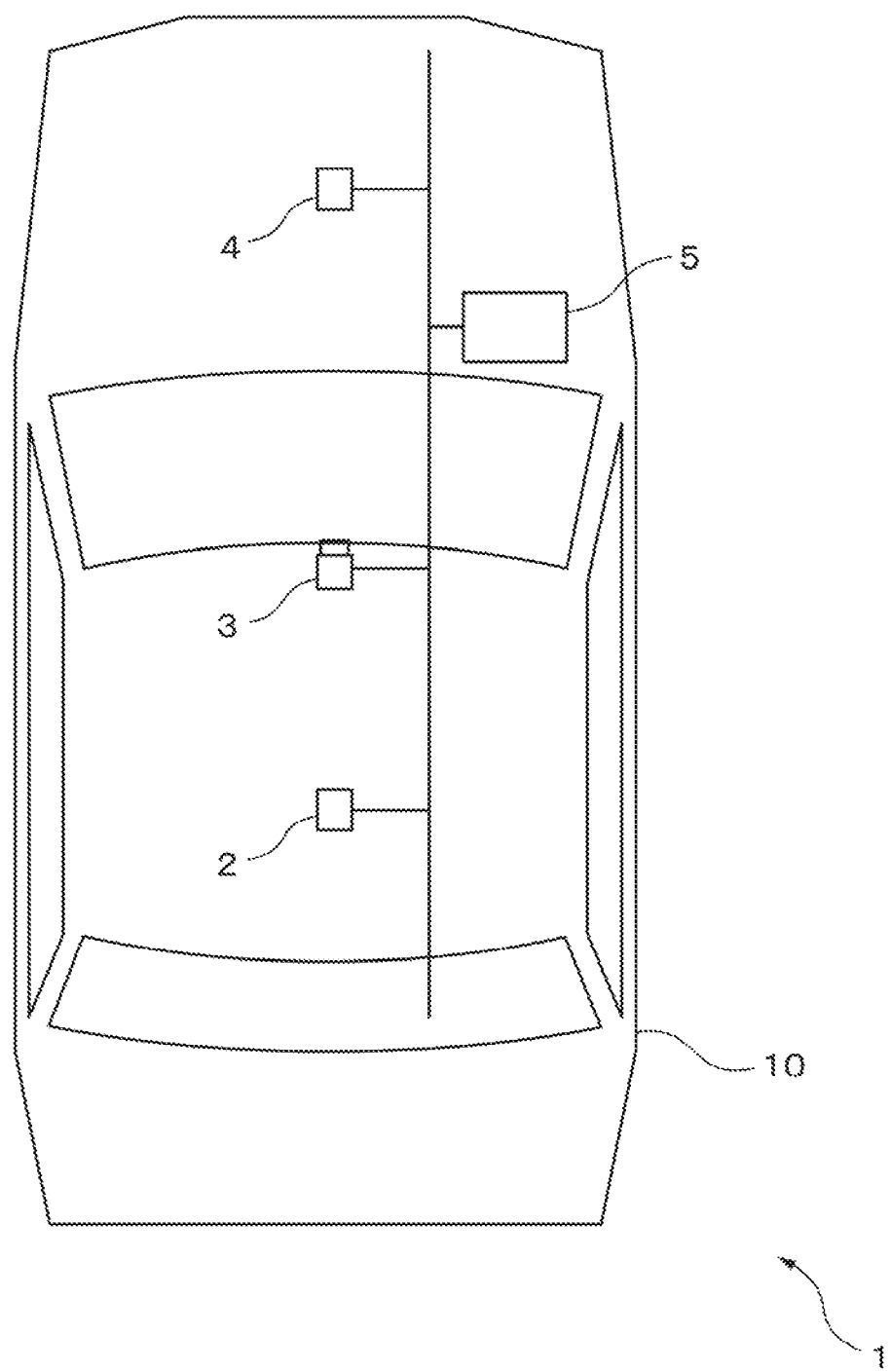
FIG. 1 schematically illustrates the configuration of a vehicle control system equipped with a vehicle controller.
Figure 2:
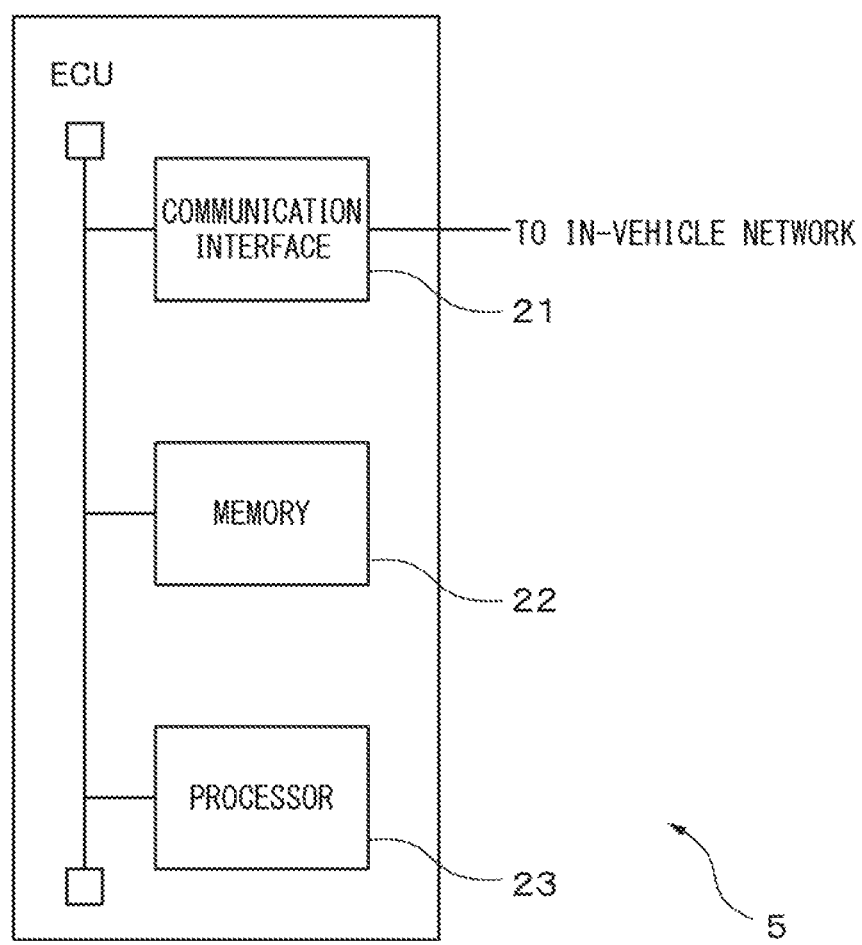
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In this embodiment, the vehicle control system 1, which is mounted on a vehicle 10 and controls the vehicle 10, includes a GPS receiver 2, a camera 3, a storage device 4, and an electronic control unit (ECU) 5, which is an example of the vehicle controller. The GPS receiver 2, the camera 3, and the storage device 4 are connected to the ECU 5 via an in-vehicle network conforming to a standard, such as a controller area network, so that they can communicate with each other. The vehicle control system 1 may further include a distance sensor (not illustrated), such as LiDAR or radar, which measures the distances from the vehicle 10 to objects around the vehicle 10; a navigation device (not illustrated) for searching for a planned travel route to a destination; and a wireless communication device (not illustrated) for wireless communication with another device.

The GPS receiver 2, which is an example of the position measuring unit, receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 5 via the in-vehicle network at predetermined intervals. The vehicle 10 may include a receiver conforming to a satellite positioning system other than the GPS receiver 2. In this case, this receiver determines the position of the vehicle 10.

The camera 3, which is an example of the image capturing unit, includes a two-dimensional detector constructed from an array of optoelectronic transducers, such as CCD or C-MOS, having sensitivity to visible light and a focusing optical system that forms an image of a target region on the two-dimensional detector. The camera 3 is mounted, for example, in the interior of the vehicle 10 so as to be oriented, for example, to the front of the vehicle 10. The camera 3 captures a region in front of the vehicle 10 every predetermined capturing period (e.g., 1/30 to 1/10 seconds), and generates images in which this region is captured. The images obtained by the camera 3 may be color or grayscale images. The vehicle 10 may include multiple cameras taking pictures in different orientations or having different focal lengths.

Every time the camera 3 generates an image, the camera 3 outputs the generated image to the ECU 5 via the in-vehicle network.

The storage device 4, which is an example of the storage unit, includes, for example, at least one of a hard disk drive, a nonvolatile semiconductor memory, and an optical recording medium and an access device therefor. The storage device 4 stores a high-precision map, which is an example of the map information. The high-precision map includes, for example, information indicating the presence or absence and the positions of lane lines at locations of a road included in a predetermined region represented in this map. The high-precision map may further include information indicating road markings other than lane lines, such as stop lines, and information indicating signposts.

The storage device 4 may further include a processor for executing, for example, a process to update the high-precision map and a process related to a request from the ECU 5 to read out the high-precision map. For example, every time the vehicle 10 moves a predetermined distance, the storage device 4 may transmit the current position of the vehicle 10 and a request to obtain a high-precision map to a map server via the wireless communication device (not illustrated), and receive a high-precision map of a predetermined region around the current position of the vehicle 10 from the map server via the wireless communication device. When receiving a request from the ECU 5 to read out the high-precision map, the storage device 4 cuts out that portion of the high-precision map stored therein which includes the current position of the vehicle 10 and which represents a region smaller than the predetermined region, and outputs the cut portion to the ECU 5 via the in-vehicle network.

The ECU 5 controls travel of the vehicle 10 to automatically drive the vehicle 10.

As illustrated in FIG. 2, the ECU 5 includes a communication interface 21, a memory 22, and a processor 23. The communication interface 21, the memory 22, and the processor 23 may be separate circuits or a single integrated circuit.

The communication interface 21 includes an interface circuit for connecting the ECU 5 to the in-vehicle network. Every time the communication interface 21 receives positioning information from the GPS receiver 2, the communication interface 21 passes the positioning information to the processor 23. Every time the communication interface 21 receives an image from the camera 3, the communication interface 21 passes the received image to the processor 23. Additionally, the communication interface 21 passes the high-precision map read from the storage device 4 to the processor 23.

The memory 22, which is another example of the storage unit, includes, for example, volatile and nonvolatile semiconductor memories. The memory 22 stores various types of data used in a vehicle control process executed by the processor 23 of the ECU 5. For example, the memory 22 stores images of surroundings of the vehicle 10; the result of determination of the position of the vehicle; the high-precision map; internal parameters indicating the focal length, angle of view, orientation, and mounted position of the camera 3; and a set of parameters for specifying a classifier used for detecting, for example, lane lines. Additionally, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

Figure 3:
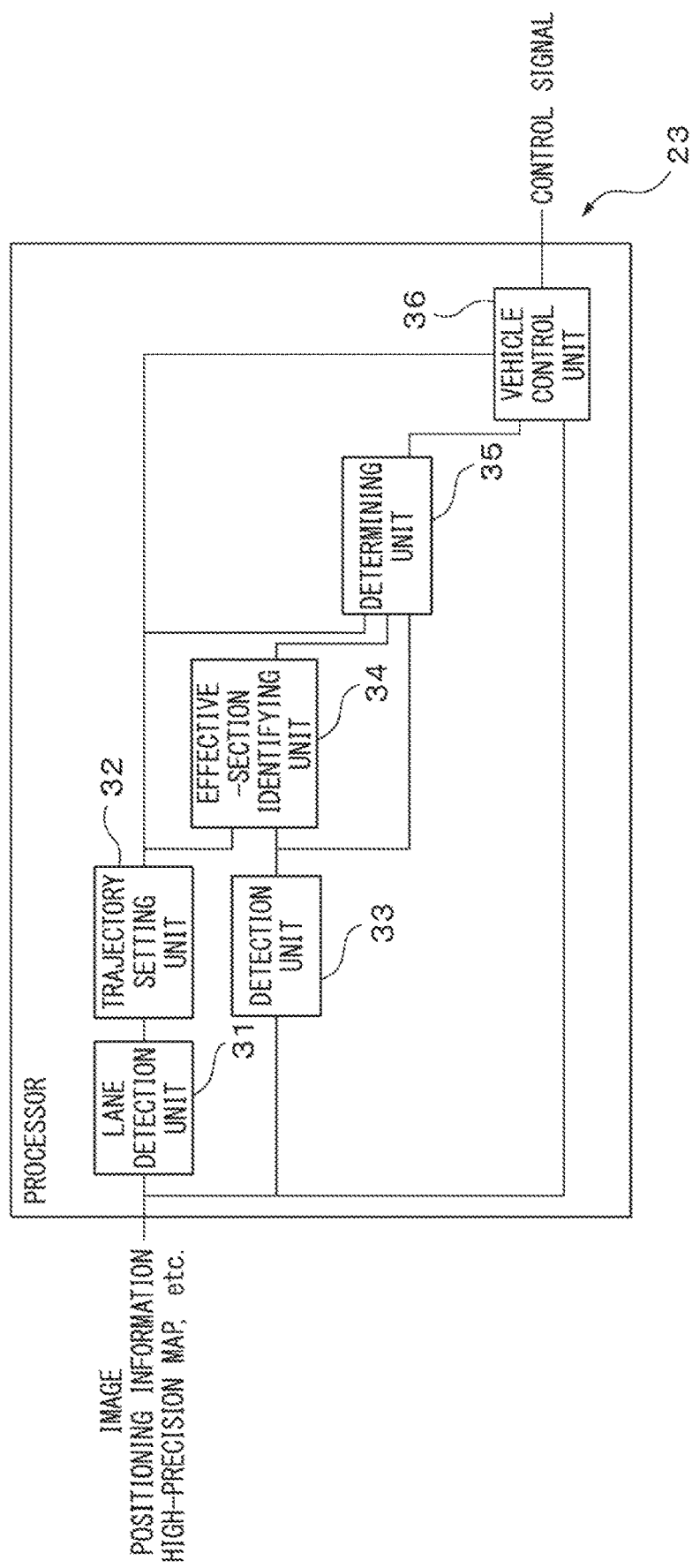
FIG. 3 is a functional block diagram of a processor of the electronic control unit, related to a vehicle control process.

FIG. 3 is a functional block diagram of the processor 23, related to the vehicle control process. The processor 23 includes a lane detection unit 31, a trajectory setting unit 32, a detection unit 33, an effective-section identifying unit 34, a determining unit 35, and a vehicle control unit 36. These units included in the processor 23 are, for example, functional modules implemented by a computer program executed on the processor 23, or may be dedicated operating circuits provided in the processor 23.

The lane detection unit 31 detects a lane being traveled by the vehicle 10 (hereafter, a "travel lane"). For example, the lane detection unit 31 refers to the current position of the vehicle 10 measured by the GPS receiver 2 and the high-precision map to identify the road being traveled by the vehicle 10, and detects a lane in the identified road on which the vehicle 10 can travel as the travel lane. For example, in the case that the road at the current position of the vehicle 10 is a two-lane road where vehicles keep to the left, the lane detection unit 31 detects the left lane with respect to the travel direction of the vehicle 10 as the travel lane.

Alternatively, the lane detection unit 31 may compare an image obtained by the camera 3 with the high-precision map to detect the travel lane. In this case, for example, the lane detection unit 31 inputs the image into a classifier to detect features on or near the road represented in the image. As such a classifier, the lane detection unit 31 may uses, for example, a deep neural network (DNN) having a convolutional neural network (CNN) architecture, e.g., Single Shot MultiBox Detector (SSD) or Faster R-CNN. Such a classifier is trained in advance to detect a detection target feature from an image. With an assumption about the position and orientation of the vehicle 10, the lane detection unit 31 projects features detected from the image onto the high-precision map or features on or near the road around the vehicle 10 in the high-precision map onto the image by referring to internal parameters of the camera 3. Then, the lane detection unit 31 estimates the current position and orientation of the vehicle 10 to be the position and orientation of the vehicle 10 for the case that the features detected from the image best match those represented in the high-precision map. Of the individual lanes represented in the high-precision map, the lane detection unit 31 detects the lane including the estimated current position of the vehicle 10 as the travel lane.

The lane detection unit 31 notifies information indicating the detected travel lane and the current position of the vehicle 10 to the trajectory setting unit 32 and the vehicle control unit 36.

When receiving the information indicating the detected travel lane and the current position of the vehicle 10 from the lane detection unit 31, the trajectory setting unit 32 sets a planned trajectory along the travel lane from the current position of the vehicle 10 to a predetermined distance away. For example, the trajectory setting unit 32 refers to the high-precision map to set a planned trajectory on the center of the travel lane.

The trajectory setting unit 32 notifies the set planned trajectory to the effective-section identifying unit 34, the determining unit 35, and the vehicle control unit 36.

The detection unit 33 detects a lane line of the travel lane and an obstacle in an area around the vehicle 10 from an image obtained by the camera 3. For example, the detection unit 33 inputs an image into a classifier to detect a lane line and an obstacle represented in the image. The obstacle is an object impeding travel of the vehicle 10, such as a parked vehicle or a fallen object on the road. As such a classifier, the detection unit 33 may use a classifier similar to that described in relation to the lane detection unit 31, e.g., SSD or Faster R-CNN. Alternatively, as such a classifier, the detection unit 33 may use a DNN for semantic segmentation that identifies, for each pixel, the type of object represented in the pixel, e.g., a fully convolutional network (FCN) or U-Net. Such a classifier is trained in advance to detect a lane line and an obstacle, which are detection targets, from an image.

In the case that the vehicle 10 is equipped with a distance sensor, the detection unit 33 may detect an obstacle, based on a ranging signal obtained by the distance sensor. In this case also, the detection unit 33 inputs a ranging signal into a classifier that has been trained to detect an obstacle from a ranging signal, thereby detecting an obstacle. In this case, since the direction to the obstacle is identified in the ranging signal by the classifier, the detection unit 33 can estimate the distance to the detected obstacle by referring to the distance value of the ranging signal in the identified direction.

The detection unit 33 notifies the effective-section identifying unit 34 of information indicating the position of the lane line in the image, and the determining unit 35 of information indicating the position of the obstacle in the image or indicating the distance and direction to the obstacle detected by the distance sensor.

The effective-section identifying unit 34 identifies a section of the planned trajectory matching the lane line detected by the detection unit 33 between the travel lane and an adjacent lane as an effective section, based on the detected lane line.

FIGS. 4A to 4D illustrate examples of the effective section.

Figure 4A:
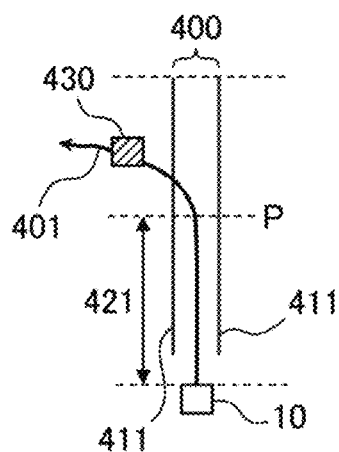
FIG. 4A illustrates an example of the effective section.

In the example illustrated in FIG. 4A, a planned trajectory 401 is curved relative to a real travel lane 400 from the middle because, for example, an adjacent lane is erroneously detected as the travel lane; the difference between the curvature of the planned trajectory 401 and the curvature of lane line 411 between the travel lane and the adjacent lane increases with the distance from the vehicle 10. In this case, the effective-section identifying unit 34 identifies a section of the planned trajectory 401 from the current position of the vehicle 10 to a position P where the difference between the curvatures of the planned trajectory 401 and the lane line 411 exceeds a predetermined threshold (a first section) as an effective section 421. Such a position P will be referred to as a "bending position" below for convenience of description. The planned trajectory 401, which is set along the detected travel lane by referring to the high-precision map, can be set as far as a position beyond the range of the camera 3 or another sensor. For this reason, in the case that the section from the current position of the vehicle 10 to a bending position P is an effective section, the effective-section identifying unit 34 can set a relatively long effective section, which enables the vehicle control unit 36 to start controlling motion of the vehicle 10 to avoid a collision between the vehicle 10 and an obstacle at a relatively early stage.

Figure 4C:
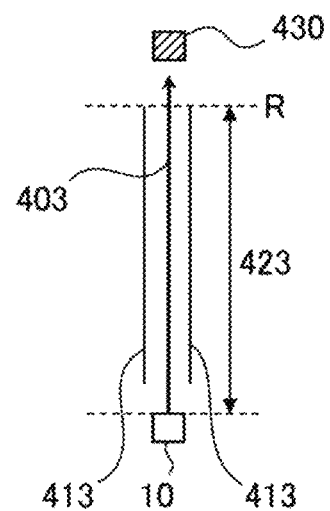
FIG. 4C illustrates an example of the effective section.
Figure 4B:
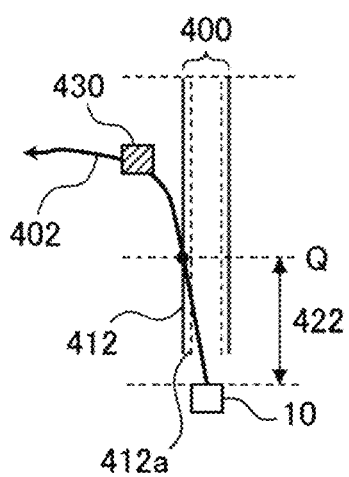
FIG. 4B illustrates an example of the effective section.

In the example illustrated in FIG. 4B, a planned trajectory 402 crosses the left lane line 412 of the travel lane 400 in the middle because, for example, an adjacent lane is erroneously detected as the travel lane. In this case, the effective-section identifying unit 34 identifies a section of the planned trajectory 402 from the current position of the vehicle 10 to a position Q where the planned trajectory 402 and the lane line 412 cross (a second section) as an effective section 422. Such a position Q will be referred to as a "crossing position" below for convenience of description. To reduce the influence of an error in recognition of the position of the lane line 412 on control of the vehicle 10, the effective-section identifying unit 34 may detect the position where the planned trajectory 402 crosses a virtual line (indicated by a broken line 412a) located a predetermined offset distance inwardly of the travel lane relative to the lane line 412, as the crossing position Q. The error in the position of a lane line is likely to increase with the curvature of the lane line or with the distance from the vehicle 10. Thus the effective-section identifying unit 34 may increase the predetermined offset distance with the curvature of the lane line crossing the planned trajectory or with the distance from the vehicle 10. Alternatively, the effective-section identifying unit 34 may refer to the high-precision map and the current position of the vehicle 10 indicated by the latest positioning information to identify the standard of the road being traveled by the vehicle 10, and set the predetermined offset distance depending on the standard. Since a higher-standard road generally has fewer curves with large curvatures, the effective-section identifying unit 34 may shorten the predetermined offset distance as the standard of the road being traveled by the vehicle 10 is higher. In this case, the effective-section identifying unit 34 can appropriately set the offset distance irrespective of the result of detection of a lane line from an image.

In the example illustrated in FIG. 4C, a planned trajectory 403 is set longer than a lane line 413 detected by the detection unit 33 between the travel lane and an adjacent lane, and has neither bending position P nor crossing position Q. When neither bending position P nor crossing position Q is detected, the effective-section identifying unit 34 identifies a section of the planned trajectory 403 from the current position of the vehicle 10 to the farthest point R of the detected lane line 413 (a third section) as an effective section 423. In other words, the effective section 423 has the same length as the section from the current position of the vehicle 10 to the farthest point R of the detected lane line 413. In the case that the detected farthest points of the left and right lane lines of the travel lane differ, the effective-section identifying unit 34 may identify an effective section, based on the lane line whose detected farthest point is farther from the current position of the vehicle 10.

Figure 4D:
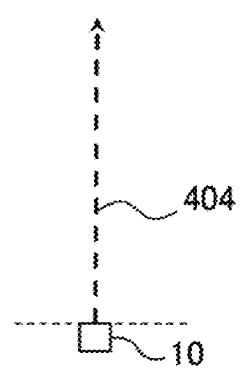
FIG. 4D illustrates an example of the effective section.

In the example illustrated in FIG. 4D, no lane line is detected between the travel lane and an adjacent lane. Thus, no effective section is identified for a planned trajectory 404. In other words, the length of the effective section is 0.

The positions of pixels in an image correspond one-to-one to the directions from the camera 3 to objects represented in the respective pixels. Thus, for each pixel representing a lane line in an image, the effective-section identifying unit 34 can estimate the actual real-space position of the lane line represented in the pixel by referring to the position of the pixel as well as internal parameters such as the focal length and the mounted position of the camera 3. The real space herein is represented by a coordinate system relative to a predetermined point of the vehicle 10 (e.g., the center of the front end of the vehicle 10). In this way, the effective-section identifying unit 34 can estimate the real-space position of a lane line detected from an image, and thus determine the position of the furthest end of the detected lane line or the position where the planned trajectory and the lane line cross, based on the estimated position. To calculate the difference between the curvatures of the planned trajectory and the detected lane line, the effective-section identifying unit 34 divides, for example, the planned trajectory and the detected lane line into subsections each having a predetermined length. Then, for each divided subsection, the effective-section identifying unit 34 determines the curvature of the planned trajectory in the subsection from the positions of the planned trajectory at both ends and the midpoint of the subsection. Similarly, for each divided subsection, the effective-section identifying unit 34 determines the curvature of the lane line in the subsection from the positions of the lane line at both ends and the midpoint of the subsection.

When both the bending position P illustrated in FIG. 4A and the crossing position Q illustrated in FIG. 4B are determined, the effective-section identifying unit 34 may set a section between the closer to the vehicle 10 of these positions and the current position of the vehicle 10 to be an effective section. For example, referring back to FIG. 4A, the planned trajectory 401 crosses the lane line 411 farther from the vehicle 10 than the bending position P. Hence the effective section 421 is identified as the section from the current position of the vehicle 10 to the bending position P, as described above. Referring back to FIG. 4B, the difference between the curvatures of the planned trajectory 402 and the lane line 412 exceeds the threshold farther from the vehicle 10 than the crossing position Q. Hence the effective section 422 is identified as the section from the current position of the vehicle 10 to the crossing position Q, as described above.

The effective-section identifying unit 34 notifies information indicating the effective section of the planned trajectory to the determining unit 35.

The determining unit 35 determines whether the obstacle detected by the detection unit 33 is located in the effective section of the planned trajectory and whether the obstacle lies on the planned trajectory.

In the case that the obstacle is detected from an image generated by the camera 3, the determining unit 35 estimates, for each pixel representing the obstacle in the image, the actual real-space position of the obstacle represented in the pixel by referring to the position of the pixel as well as internal parameters such as the focal length and the mounted position of the camera 3. The real space herein is represented by a coordinate system relative to a predetermined point of the vehicle 10. In the case that the obstacle is detected from a ranging signal generated by the distance sensor, the direction and distance to the obstacle are determined from the position in the vehicle 10 where the distance sensor is mounted, and thus the actual position of the obstacle is estimated on the basis of this direction and distance. The determining unit 35 compares the estimated real-space position of the obstacle with the effective section to determine whether the obstacle is located in the elective section.

When it is determined that the obstacle is located in the effective section of the planned trajectory, the determining unit 35 determines whether the obstacle lies on the planned trajectory, and if so, determines that the obstacle is located on the planned trajectory. When no obstacle is detected, the determining unit 35 determines that no obstacle is located on the planned trajectory.

The determining unit 35 may first determine whether the obstacle lies on the planned trajectory, and if so, determine whether the obstacle is located in the effective section of the planned trajectory.

Even if the obstacle is not located in the effective section of the planned trajectory, the determining unit 35 may determine whether the obstacle lies on the planned trajectory in the case that the distance from the vehicle 10 to the obstacle is not greater than a predetermined distance threshold. The predetermined distance threshold may be, for example, the shortest distance such that the vehicle 10 can avoid a collision with the obstacle by a motion for collision avoidance, or the shortest distance multiplied by a predetermined safety factor, e.g., the distance corresponding to a time to collision (TTC) of 1.4 seconds. Thus the determining unit 35 may increase the predetermined distance threshold with the speed of the vehicle 10 measured by a vehicle speed sensor (not illustrated) of the vehicle 10.

The determining unit 35 notifies the vehicle control unit 36 of the results of determination whether the obstacle is located in the effective section of the planned trajectory and whether the obstacle lies on the planned trajectory. The determining unit 35 may further notify the vehicle control unit 36 of the result of determination whether the distance from the vehicle 10 to the obstacle is not greater than the predetermined distance threshold.

The vehicle control unit 36 executes automated driving control of the vehicle 10 so that it will travel along the planned trajectory. For example, the vehicle control unit 36 determines the steering angle for the vehicle 10 to travel along the planned trajectory by referring to the current position of the vehicle 10 and the planned trajectory, and outputs a control signal depending on the steering angle to an actuator (not illustrated) that controls the steering wheel of the vehicle 10. The vehicle control unit 36 also determines target acceleration of the vehicle 10 according to a target speed of the vehicle 10 and its current speed measured by the vehicle speed sensor (not illustrated), and sets the degree of accelerator opening or the amount of braking so that the acceleration of the vehicle 10 will be equal to the target acceleration. The vehicle control unit 36 then determines the amount of fuel injection according to the set degree of accelerator opening, and outputs a control signal depending on the amount of fuel injection to a fuel injector of an engine of the vehicle 10. Alternatively, the vehicle control unit 36 outputs a control signal depending on the set amount of braking to the brake of the vehicle 10. The vehicle control unit 36 refers the high-precision map to identify the legally permitted speed of the road being traveled by the vehicle 10, and sets the target speed of the vehicle 10 according to the legally permitted speed. Alternatively, the vehicle control unit 36 may set the target speed of the vehicle 10 so as to keep the distance to a vehicle traveling ahead of the vehicle 10 constant.

When receiving from the determining unit 35 the result of determination that an obstacle is located in the effective section of the planned trajectory and lies on the planned trajectory, the vehicle control unit 36 controls motion of the vehicle 10 to avoid a collision between the vehicle 10 and the obstacle. For example, the vehicle control unit 36 sets the amount of braking so that the vehicle 10 will stop before colliding with the obstacle, and outputs a control signal depending on the set amount of braking to the brake of the vehicle 10 to decelerate the vehicle 10. Alternatively, the vehicle control unit 36 may determine the steering angle so that the vehicle 10 will change its direction before colliding with the obstacle, and output a control signal depending on the steering angle to the actuator (not illustrated) that controls the steering wheel of the vehicle 10.

As described above, the presence of an obstacle in the effective section of the planned trajectory is set as one of conditions for controlling motion of the vehicle 10 to avoid a collision between the vehicle 10 and the obstacle, which enables the vehicle control unit 36 to prevent controlling motion of the vehicle 10 for collision avoidance although the vehicle 10 is unlikely to collide with the obstacle. For example, referring back to FIG. 4A, there is a detected obstacle 430 on the planned trajectory 401 but outside the effective section 421. Hence, control of motion of the vehicle 10 for collision avoidance will not be executed. Similarly, referring back to FIG. 4B, there is a detected obstacle 430 on the planned trajectory 402 but outside the effective section 422. Hence, control of motion of the vehicle 10 for collision avoidance will not be executed. In the case illustrated in FIG. 4A or 4B, when the travel lane is correctly recognized and thereby the planned trajectory is reset along the real travel lane during the approach of the vehicle 10 to the obstacle, the obstacle will fall outside the planned trajectory. Hence, control of motion of the vehicle 10 for collision avoidance will not be executed in the end. In the example illustrated in FIG. 4C also, there is an obstacle 430 outside the effective section 423, and thus control of motion of the vehicle 10 for collision avoidance will not be executed. However, in this case, the planned trajectory 403 is set along the real travel lane, and the obstacle 430 is located on the planned trajectory 403. For this reason, after the obstacle 430 becomes included in the effective section 423 by the approach of the vehicle 10 to the obstacle 430, control of motion of the vehicle 10 for collision avoidance will be executed.

Additionally, also when receiving from the determining unit 35 the results of determination that the distance from the vehicle 10 to the obstacle is not greater than the predetermined distance threshold and that the obstacle lies on the planned trajectory, the vehicle control unit 36 controls motion of the vehicle 10 to avoid a collision between the vehicle 10 and the obstacle.

Figure 5:
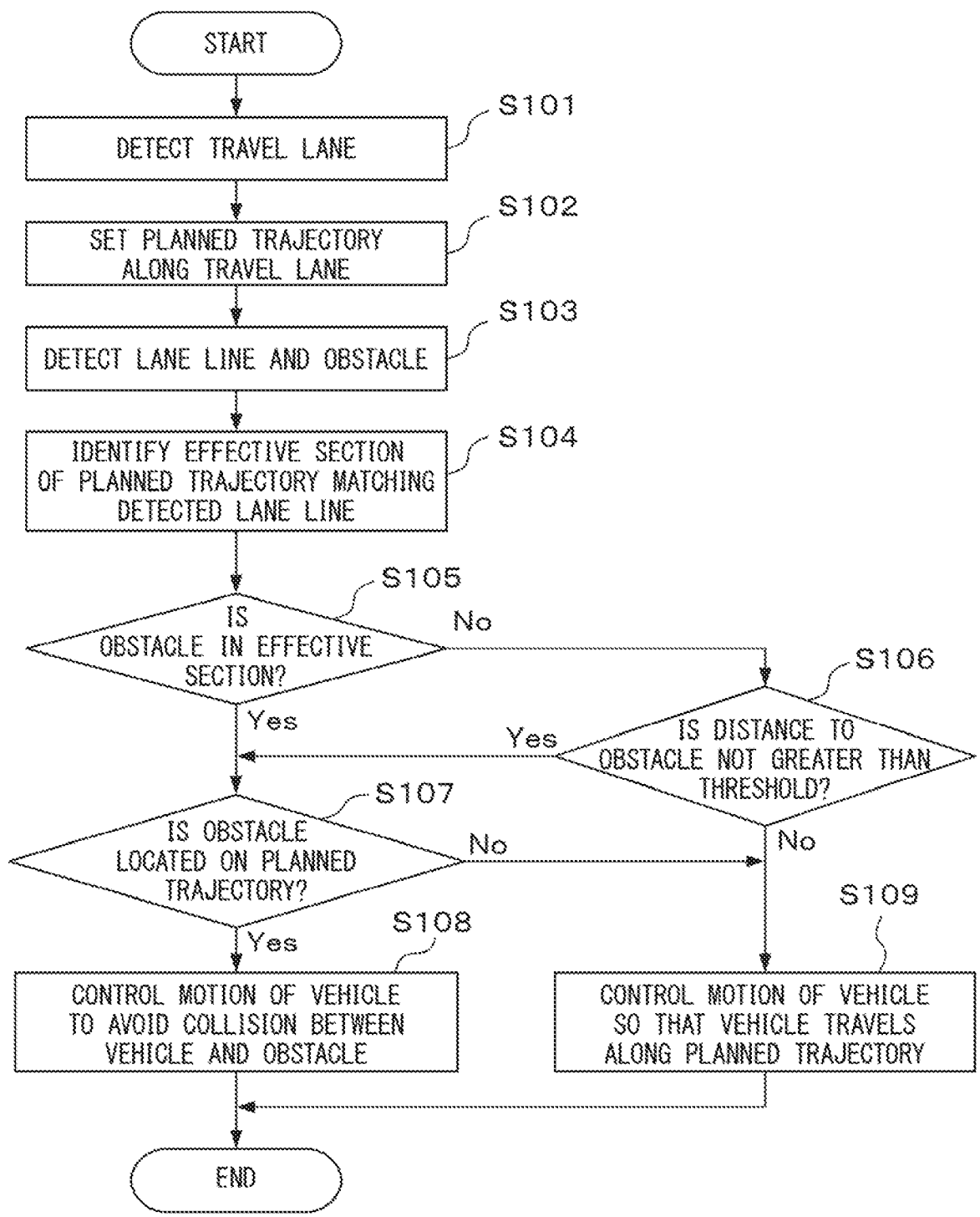
FIG. 5 is an operation flowchart of a vehicle control process.

FIG. 5 is an operation flowchart of the vehicle control process executed by the processor 23. The processor 23 may execute the vehicle control process in accordance with the following operation flowchart at predetermined intervals.

The lane detection unit 31 of the processor 23 detects the lane being traveled by the vehicle, i.e., the travel lane (step S101). The trajectory setting unit 32 of the processor 23 sets a planned trajectory along the identified travel lane from the current position of the vehicle 10 to a predetermined distance away (step S102).

The detection unit 33 of the processor 23 detects a lane line between the travel lane and an adjacent lane and an obstacle in an area around the vehicle 10 from an image obtained by the camera 3 or a ranging signal by the distance sensor (step S103). Additionally, the effective-section identifying unit 34 of the processor 23 identifies a section of the planned trajectory matching the detected lane line as an effective section, based on the lane line between the travel lane and the adjacent lane (step S104).

The determining unit 35 of the processor 23 determines whether the obstacle is located in the effective section of the planned trajectory (step S105). When the obstacle is not in the effective section (No in step S105), the determining unit 35 determines whether the distance from the vehicle 10 to the obstacle is not greater than a predetermined distance threshold (step S106).

When the obstacle is located in the effective section of the planned trajectory (Yes in step S105) or when the distance from the vehicle 10 to the obstacle is not greater than the predetermined distance threshold (Yes in step S106), the vehicle control unit 36 determines whether the obstacle is located on the planned trajectory (step S107).

When the obstacle is located on the planned trajectory (Yes in step S107), the vehicle control unit 36 of the processor 23 controls motion of the vehicle 10 to avoid a collision between the vehicle 10 and the obstacle (step S108).

When the distance from the vehicle 10 to the obstacle is greater than the predetermined distance threshold (No in step S106) or when the obstacle is not located on the planned trajectory (No in step S107), the vehicle control unit 36 controls motion of the vehicle 10 so that it will travel along the planned trajectory (step S109). After step S108 or S109, the processor 23 terminates the vehicle control process.

As has been described above, the vehicle controller detects a travel lane and sets a planned trajectory along the detected travel lane. Additionally, the vehicle controller detects a lane line dividing the travel lane and an adjacent lane from an image that is generated by the camera mounted on the vehicle and that represents a region around the vehicle. Based on the detected lane line, the vehicle controller further identifies a section of the planned trajectory matching the detected lane line as an effective section. In the case that an obstacle detected by the sensor mounted on the vehicle is located on the planned trajectory and in the effective section, the vehicle controller controls motion of the vehicle to avoid a collision between the obstacle and the vehicle. In this way, the vehicle controller can prevent unnecessary control of motion of the vehicle, even if it has erroneously recognized an adjacent lane as the travel lane and set a planned trajectory along the adjacent lane and thus an obstacle with low risk of collision is located on the erroneously set planned trajectory.

According to a modified example, in the case that the obstacle is not located in the effective section of the planned trajectory and that the distance from the vehicle 10 to the obstacle is not greater than the predetermined distance threshold, the determining unit 35 may predict the trajectory of the vehicle 10 from the current time until a predetermined time ahead by executing a predetermined prediction process on the trajectory of the vehicle 10 calculated from information indicating motion of the vehicle 10 obtained in a preceding predetermined period, such as the yaw rate, acceleration, and speed of the vehicle 10. In this case, the determining unit 35 obtains the information indicating motion of the vehicle 10 from sensors for measuring motion of the vehicle 10, such as a yaw rate sensor (not illustrated), an acceleration sensor (not illustrated), and a vehicle speed sensor (not illustrated). Then, the determining unit 35 may determine whether the obstacle lies on the predicted trajectory of the vehicle 10. In this case, when the obstacle lies on the predicted trajectory of the vehicle 10, the vehicle control unit 36 may control motion of the vehicle 10 to avoid a collision between the vehicle 10 and the obstacle.

A computer program for achieving the functions of the processor 23 of the ECU 5 according to the embodiment or modified example may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller comprising:
a memory configured to store map information; and
a processor configured to:
compare an image generated by a camera mounted on a vehicle or a position measured by a position measuring device with the map information to detect a lane being traveled by the vehicle, the image representing surroundings of the vehicle, the position measuring device being configured to measure the position of the vehicle,
set a planned trajectory to be traveled by the vehicle along the lane,
detect a pair of lane lines demarcating the lane and an obstacle in an area around the vehicle from the image,
identify an effective section of the planned trajectory, the effective section being a section in which the planned trajectory is between the detected pair of lane lines, and
control motion of the vehicle to avoid a collision between the obstacle and the vehicle in the case that the obstacle is located in the effective section and on the planned trajectory,
wherein the processor identifies the shorter of a first section and a second section as the effective section, the first section extending from a current position of the vehicle to a bending position where a difference between curvatures of the planned trajectory and the detected pair of lane lines exceeds a predetermined value, the second section extending from the current position of the vehicle to a crossing position where the planned trajectory and one of the detected pair of lane lines cross, and
the processor identifies, as the effective section, a third section from the current position of the vehicle to the farthest position of the detected pair of lane lines, when neither the bending position nor the crossing position is detected.

2. The vehicle controller according to claim 1, wherein the processor controls motion of the vehicle to avoid a collision between the obstacle and the vehicle in the case that the obstacle is located outside the effective section and on the planned trajectory and that the distance from the current position of the vehicle to the obstacle is not greater than a predetermined distance threshold.

3. A method for controlling a vehicle, comprising:
comparing an image generated by a camera mounted on a vehicle or a position measured by a position measuring device with map information to detect a lane being traveled by the vehicle, the image representing surroundings of the vehicle, the position measuring device being configured to measure the position of the vehicle;
setting a planned trajectory to be traveled by the vehicle along the lane;
detecting a pair of lane lines demarcating the lane and an obstacle in an area around the vehicle from the image;
identifying an effective section of the planned trajectory, the effective section being a section in which the planned trajectory is between the detected pair of lane lines; and
controlling motion of the vehicle to avoid a collision between the obstacle and the vehicle in the case that the obstacle is located in the effective section and on the planned trajectory,
wherein identifying an effective section includes:

identifying the shorter of a first section and a second section as the effective section, the first section extending from a current position of the vehicle to a bending position where a difference between curvatures of the planned trajectory and the detected pair of lane lines exceeds a predetermined value, the second section extending from the current position of the vehicle to a crossing position where the planned trajectory and one of the detected pair of lane lines cross, and identifying, as the effective section, a third section from the current position of the vehicle to the farthest position of the detected pair of lane lines, when neither the bending position nor the crossing position is detected.

* * * * *